United States Patent
Gudorf

(10) Patent No.: US 10,655,522 B2
(45) Date of Patent: May 19, 2020

(54) EXHAUST FLUID FILTER INCLUDING HYDROCARBON DETECTION WITNESS MEDIA

(71) Applicant: CUMMINS EMISSION SOLUTIONS, INC., Columbus, IN (US)

(72) Inventor: Kevin Gudorf, Indianapolis, IN (US)

(73) Assignee: CUMMINS EMISSION SOLUTIONS, INC., Columbus, IN (US)

(*) Notice: Subject to any disclaimer, the term of this patent is extended or adjusted under 35 U.S.C. 154(b) by 0 days.

(21) Appl. No.: 16/422,530

(22) Filed: May 24, 2019

(65) Prior Publication Data

US 2019/0277178 A1  Sep. 12, 2019

Related U.S. Application Data

(63) Continuation of application No. 15/523,813, filed as application No. PCT/US2014/064853 on Nov. 10, 2014, now Pat. No. 10,344,649.

(51) Int. Cl.
*F01N 3/20* (2006.01)
*F01N 3/021* (2006.01)

(52) U.S. Cl.
CPC .......... *F01N 3/2066* (2013.01); *F01N 3/021* (2013.01); *F01N 2610/02* (2013.01); *F01N 2610/1426* (2013.01); *F01N 2900/1818* (2013.01); *Y02T 10/24* (2013.01)

(58) Field of Classification Search
CPC ............... F01N 2610/02; F01N 2610/1426
See application file for complete search history.

(56) References Cited

U.S. PATENT DOCUMENTS

| | | |
|---|---|---|
| 3,596,441 A | 8/1971 | Lundahl |
| 3,697,226 A | 10/1972 | Hirschfeld et al. |
| 5,251,564 A | 10/1993 | Rim et al. |
| 5,375,592 A | 12/1994 | Kirk et al. |
| 5,486,336 A | 1/1996 | Dalla Betta et al. |
| 5,759,492 A | 6/1998 | Reale |
| 6,120,580 A | 9/2000 | Sandler |
| 6,892,530 B2 | 5/2005 | Montreuil et al. |
| 7,219,491 B2 | 5/2007 | Nakatani |
| 7,666,253 B2 | 2/2010 | Krueger et al. |

(Continued)

OTHER PUBLICATIONS

Miller, David. "Detection of Fuel in AdBlue Tanks with Oil Test Paper." Oct. 4, 2013. Website: https://camblab.info/wp/index.php/detection-of-fuel-in-adblue-tanks-with-oil-test-paper/ (Year: 2013).*

(Continued)

*Primary Examiner* — Audrey K Bradley
*Assistant Examiner* — Anthony Ayala Delgado
(74) *Attorney, Agent, or Firm* — Foley & Lardner LLP

(57) ABSTRACT

An aftertreatment system includes an exhaust reductant tank configured to store an exhaust reductant. A filter is fluidically coupled to the exhaust reductant tank. The aftertreatment system includes a hydrocarbon detection device configured to indicate the presence of a hydrocarbon in the exhaust reductant. A catalyst is included in the system and configured to treat the exhaust reductant flowing through the system. The hydrocarbon detection device can include a hydrophobic paper, and can be disposed in the filter.

20 Claims, 4 Drawing Sheets

(56) References Cited

U.S. PATENT DOCUMENTS

| | | |
|---|---|---|
| 7,870,779 B2 | 1/2011 | Lattin et al. |
| 8,713,914 B2 | 5/2014 | Schmieg et al. |
| 2004/0098980 A1 | 5/2004 | Montreuil et al. |
| 2006/0156919 A1 | 7/2006 | Sellers et al. |
| 2011/0072790 A1 | 3/2011 | Schmieg et al. |
| 2015/0218990 A1* | 8/2015 | Hudgens .............. F01N 3/2066 423/239.1 |

OTHER PUBLICATIONS

International Search Report and Written Opinion issued for PCT/US2014/064853, dated Mar. 11, 2015, 7 pages.

Miller, "Detection of fuel in AdBlue tanks with oil test paper," The Laboratory People, retrieved from https://camblab.info/wp/index.php/detection-of-fuel-in-adblue-tanks-with-oil-test-paper/, 8 pages. (2013).

Office Action issued for Indian Patent Application No. 201747013696, dated Aug. 30, 2019, 6 pages.

Examination Report issued in UK Patent Application No. GB 1707337.0 dated Mar. 6, 2020, 3 pages.

\* cited by examiner

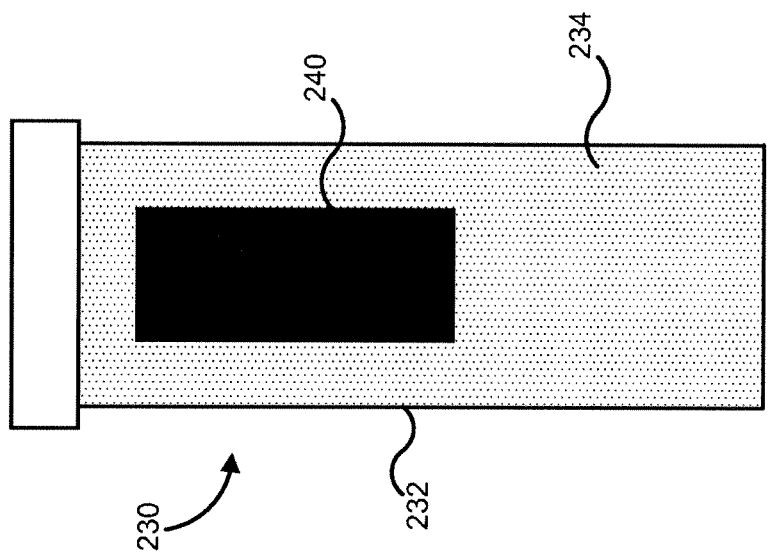
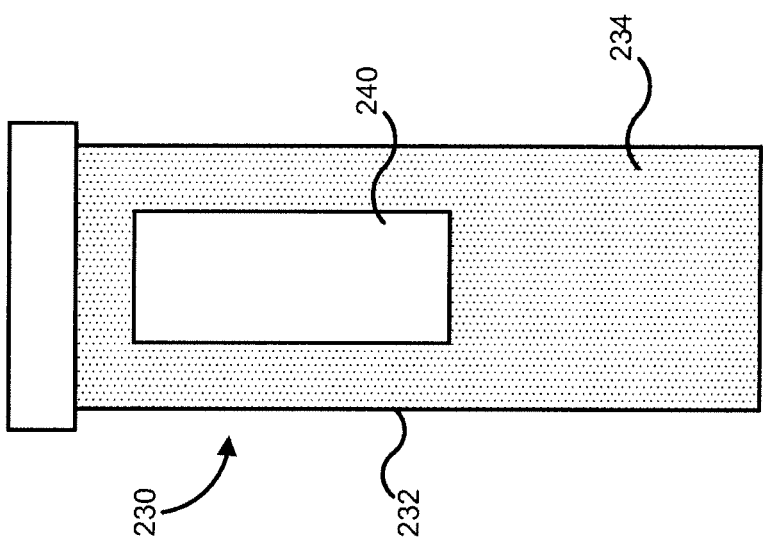

EXHAUST FLUID FILTER INCLUDING HYDROCARBON DETECTION WITNESS MEDIA

CROSS-REFERENCE TO RELATED APPLICATIONS

The present application continuation of U.S. patent application Ser. No. 15/523,813, filed May 2, 2017, which is a National Stage of PCT Application No. PCT/US2014/064853, filed Nov. 10, 2014. The contents of both applications are hereby incorporated by reference in their entireties.

TECHNICAL FIELD

The present disclosure relates generally to exhaust aftertreatment systems for use with internal combustion (IC) engines.

BACKGROUND

During the combustion process in an IC engine (e.g., a diesel-powered engine), sulfur is concurrently formed with carbon monoxide (CO) and hydrocarbons (HC) as various sulfur oxides ($SO_x$). Typically, 97-99% of the total amount of $SO_x$ present in exhaust gas includes sulfur dioxide ($SO_2$) and 1-3% includes sulfur trioxide ($SO_3$). Thus, fuels with higher sulfur content tend to produce higher amounts of $SO_3$. For example, fuel with sulfur content of 1000 ppm may form approximately 1-3 ppm $SO_3$.

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert $NO_x$ (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the SOx and/or the NOx gases. The reduction byproducts of the exhaust gas are then fluidically communicated to the catalyst included in the SCR aftertreatment system to decompose substantially all of the SOx and NOx gases into relatively harmless byproducts which are expelled out of such conventional SCR aftertreatment systems.

A major cause of breakdown and failure of conventional SCR aftertreatment systems includes contamination of the exhaust reductant with hydrocarbons. For example, the exhaust reductant can be contaminated with diesel fuel, injector cleaner (e.g., toluene), or engine oil. The hydrocarbons contaminating the exhaust reductant can super heat the selective reduction catalyst, dissolve ethylene propylene diene monomer (EPDM) seals included in an exhaust reductant tank or pump, dissolves linings from the exhaust reductant tank and lines, and can also swell a diaphragm of the exhaust reductant pump. Hydrocarbon contamination accounts for about 37% to about 50% of all failures of SCR aftertreatment systems. This results in a significant number of warranty claims from customers, as it is not always possible to determine if the failure of the SCR aftertreatment system was due to hydrocarbon contamination, which can be attributed to customer oversight.

SUMMARY

Embodiments described herein relate generally to exhaust aftertreatment systems for use with IC engines, and in particular to exhaust aftertreatment systems that include an exhaust reductant filter with a hydrocarbon witness detection media (also referred to herein as "hydrocarbon detection device"). In some embodiments, an aftertreatment system includes an exhaust reductant tank configured to store an exhaust reductant. A filter is fluidically coupled to the exhaust reductant tank. The aftertreatment system includes a hydrocarbon detection device configured to indicate the presence of a hydrocarbon in the exhaust reductant. A selective reduction catalyst is included in the system and configured to treat an exhaust gas flowing through the selective catalyst reduction system. In some embodiments, the exhaust reductant includes a diesel exhaust fluid. In some embodiments, the hydrocarbon detection device includes a hydrophobic paper. In one embodiment, the hydrocarbon detection device is disposed in the filter.

In another set of embodiments, a filter for use in an aftertreatment system includes a housing defining an internal volume is provided. A filter element is disposed inside the housing and is configured to filter particulate from an exhaust reductant. A hydrocarbon detection device is disposed inside the housing and is configured to indicate the presence of a hydrocarbon in the exhaust reductant. In some embodiments, the hydrocarbon detection device includes a hydrophobic paper. In some embodiments, the hydrocarbon detection device changes color when exposed to a hydrocarbon present in the exhaust reductant.

In yet another set of embodiments, a method for detecting the presence of hydrocarbons in an exhaust reductant includes flowing an exhaust reductant through an exhaust reductant filter. The exhaust reductant filter includes a housing defining an internal volume. A filter element is disposed inside the housing and is configured to filter particulate from the exhaust reductant passing through the filter element. A hydrocarbon detection device is disposed in the internal volume and is configured to indicate the presence of a hydrocarbon in the exhaust reductant. A change in color of the hydrocarbon detection device is observed. The change in color represents the presence of the hydrocarbon in the exhaust reductant. The method further includes changing the filter in response to a change in color of the hydrocarbon detection device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 2A is side view of an exhaust reductant filter that includes a hydrocarbon detection device disposed on an inner surface of a sidewall of the filter, according to an embodiment; and FIG. 2B shows a change in color experience in the hydrocarbon detection device of FIG. 2A in the presence of an exhaust redutcant that is contaminated with hydrocarbons.

Figure 1:
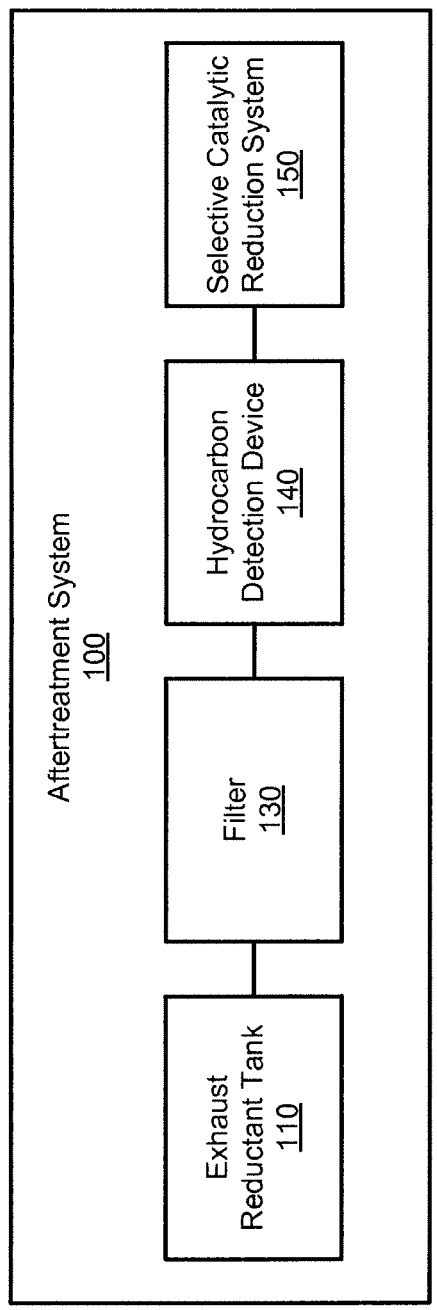
FIG. 1 is a schematic block diagram of an aftertreatment system that includes a hydrocarbon detection device, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to exhaust aftertreatment systems for use with IC engines, and in particular to exhaust aftertreatment systems that include an exhaust reductant filter with a hydrocarbon detection device. Embodiments described herein may provide several advantages over conventional aftertreatment systems including, for example: (1) visual diagnosis of hydrocarbon contamination in exhaust reductants (e.g., diesel exhaust fluid) by observing a change in color of the hydrocarbon detection device; (2) ability to detect very low concentrations of the hydrocarbon in the exhaust reductant; (3) easy adaptability to conventional aftertreatment systems without any significant changes to the conventional aftertreatment systems; and (4) providing confirmation whether any damage to an aftertreatment system is due to hydrocarbons in the exhaust reductant which is attributable to user error and not covered under warranty, thereby reducing erroneous warranty claims.

FIG. 1 shows an aftertreatment system 100 which can be used for treating exhaust gases (e.g., diesel exhaust gases) from an IC engine (e.g., a diesel engine), according to an embodiment. The aftertreatment system 100 includes an exhaust reductant tank 110 a filter 130, a hydrocarbon detection device 140, and a SCR system 150. The aftertreatment system 100 can be used with any IC engines, for example, diesel engines (e.g., automotive diesel engines, marine engines, industrial power generation diesel engines, etc.).

The exhaust reductant tank 110 is configured to store an exhaust reductant and is fluidically coupled to the filter 130. In some embodiments, the exhaust reductant tank 110 can include a diesel exhaust reductant tank and the exhaust reductant can be a diesel exhaust fluid. The diesel exhaust fluid can include, urea, an aqueous solution of urea, or any other fluid that includes ammonia, by products, or any other diesel exhaust fluid as is known in the arts (e.g., the diesel exhaust fluid marketed under the name ADBLUE®).

In some embodiments, the aftertreatment system 100 can also include an exhaust reductant pump (not shown). In such embodiments, the exhaust reductant pump can be fluidically coupled to the SCR system 150. The exhaust reductant pump can be configured to pump the exhaust reductant from the exhaust reductant tank 110 to the SCR system 150 through the filter 130. The exhaust reductant pump can include any suitable pump, for example, a diaphragm pump, a rotary pump, a positive displacement pump, a vacuum pump, or a combination thereof. In some embodiments, the operation of the exhaust reductant pump can be controlled by a control system (e.g., an electronic control system) to communicate a known or otherwise metered amount of the exhaust reductant into the SCR system 150.

The filter 130 is configured to filter any particulate from the exhaust reductant, for example, dust, organic particles, crystals (e.g., urea crystals), or any other solid particulates present in the exhaust reductant from entering the SCR system 150. The filter 130 can include a housing made of a strong and rigid material such as, for example, high density polypropylene (HDPP) which can define an internal volume to house a filter element. Any suitable filter element can be used such as, for example, a cotton filter element, an acrylonitrile butadiene styrene (ABS) filter element, any other suitable filter element or a combination thereof. The filter element can have any suitable pore size, for example, about 10 microns, about 5 microns, or about 1 micron.

The hydrocarbon detection device 140 is configured to indicate the presence of a hydrocarbon in the exhaust reductant. In some embodiments, the hydrocarbon detection device 140 can include a hydrophobic paper (e.g., filter paper). The hydrophobic paper can include a conventional paper (e.g., cellulosic paper) coated with a hydrophobic coating such as, for example, wax, styrene maleic anhydride copolymers, siloxane, GREENCOAT®, any other suitable coating, or a combination thereof. In some embodiments, the hydrocarbon detection device 140 can be formed from nylon, acrylonitrile butadiene styrene (abs), polycarbonate, cellulose, and/or polymethyl methacrylate.

The hydrocarbon detection device 140 can be configured to change color when exposed to a hydrocarbon, for example, diesel fuel, injector fluid, or oil present in the exhaust reductant (e.g., a diesel exhaust fluid). For example, the hydrocarbon detection device 140 can include hydrophobic paper which can include hydrophobic non-polar groups on its surface that repel aqueous solutions which are free of any hydrocarbons. For example, the exhaust reductant can be a diesel exhaust fluid which is generally an aqueous solution of urea. The hydrophobic paper will thus repel uncontaminated diesel exhaust fluid, and the diesel exhaust fluid will therefore, neither wet nor moisten the hydrophobic paper. However, if the diesel exhaust fluid is contaminated with hydrocarbons (e.g., diesel fuel), the hydrocarbons will be attracted to the hydrophobic non-polar groups of the hydrophobic paper (e.g., disposed on a surface of the hydrophobic paper). The hydrocarbons can then get absorbed in the hydrophobic paper, form a film on the surface of hydrophobic paper, or otherwise wet the hydrophobic paper, urging the hydrophobic paper to change color. The change in color thus indicates that the diesel exhaust fluid is contaminated with hydrocarbons.

In some embodiments, the hydrocarbon detection device 140 can be disposed in the filter 130. For example, the hydrocarbon detection device 140 can be disposed on an inner surface of a sidewall of the filter 130. Expanding further, the hydrocarbon detection device 140 can include a strip of a hydrophobic paper disposed on the inner surface of the sidewall of the filter 130. In such embodiments, the sidewall of the filter 130 can be formed from a transparent or translucent material which can allow observation of the strip of the hydrophobic paper through the sidewall of the filter. Any change in color of the hydrophobic paper can thus be attributed to the presence of one or more hydrocarbons in the exhaust reductant, as described herein.

In some embodiments, the hydrocarbon detection device 140 can be included in a filter element of the filter 130. For example, the hydrocarbon detection device 140 (e.g., hydrophobic paper) can be comminuted into particulates or powder, and packed in with the filter element into the filter 130. In such embodiments, the exhaust reductant can contact the hydrocarbon detection device 140 as it flows through the filter element of the filter 130. If any hydrocarbon contaminants are present in the exhaust reductant, the hydrocarbon detection device 140 included in the filter element can change color, which can appear as the filter element changing color. This can serve to indicate that the exhaust reductant is contaminated with hydrocarbons.

In some embodiments, the hydrocarbon detection device 140 can be disposed in the exhaust reductant tank 110. For example, the hydrocarbon detection device 140 can include a strip of hydrophobic paper disposed on an inner surface of a sidewall of the exhaust reductant tank 110. In such embodiments, the sidewall of the exhaust reductant tank 110 can be formed from a completely or substantially transparent or translucent material to allow viewing of the hydrocarbon detection device 140 through a sidewall of exhaust reductant tank 110.

In some embodiments, the hydrocarbon detection device 140 can be disposed in both, the filter 130 and the exhaust reductant tank 110. In some embodiments, one or more sidewalls of the filter 130 and/or the exhaust reductant tank 110 can be formed from a hydrophobic material such that the sidewall of the filter 130 and/or the exhaust reductant tank 110 serves as the hydrocarbon detection device 140.

The hydrocarbon detection device 140 described herein can be configured to detect very low concentrations of hydrocarbon contaminants present in the exhaust reductant (e.g., a diesel exhaust fluid). In some embodiments, the hydrocarbon detection device 140 can be configured to detect the presence of hydrocarbons in the exhaust reductant at a concentration of less than about 0.1% by weight. For example, the hydrocarbon detection device 140 can be configured to detect the presence of the hydrocarbon in the exhaust reductant at a concentration of less than about 1% by weight, for example, about 0.9%, 0.8%, 0.7%, 0.6%, 0.5%, 0.4%, 0.3%, 0.2%, 0.1%, 0.05%, or about 0.025% by weight, inclusive of all ranges and values therebetween.

The SCR system 150 is configured to treat an exhaust gas (e.g., a diesel exhaust gas) flowing through the SCR system 150. The SCR system 150 can include an injection port configured to communicate the exhaust reductant received from the exhaust reductant tank 110 via the filter 130 (e.g., pumped using the exhaust reductant pump), into one or more chambers included in the SCR system 150. The exhaust reductant reacts with the exhaust gas to at least partially reduce one or more components of the gas (e.g., SOx and NOx), or facilitate reduction of the one or more components in the presence of one or more catalysts.

The SCR system 150 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any SOx or NOx gases included in the exhaust gas are further reduced to yield an exhaust gas which is substantially free of carbon monoxide, SOx and NOx gases.

In some embodiments, a hydrocarbon detection device can be disposed inside a filter included in an aftertreatment system. For example, FIGS. 2A and 2B are side views of a filter 230 that includes a hydrocarbon detection device 240 disposed inside the filter 230. The filter 230 can be included in any aftertreatment system, for example, the aftertreatment system 100 or any other aftertreatment system configured to treat exhaust gases (e.g., diesel exhaust gases).

The filter 230 is configured to receive an exhaust reductant (e.g., a diesel exhaust fluid) from an exhaust reductant tank included in the aftertreatment system and to filter any particulates (e.g., dust, organic particles, crystals (e.g., urea crystals), etc.) from the exhaust reductant before it is communicated to an SCR system included in the aftertreatment system. The filter 230 includes a housing 232 that defines an internal volume. A filter element 234 is disposed in the internal volume defined by the housing 232, and is configured to filter particulate from the exhaust reductant. For example, the filter element 234 can be disposed in the internal volume such that the exhaust reductant can flow through the filter element 234 but particulates are trapped within the filter element 234. The filter element 234 can include any suitable filter element capable of filtering particulate from the exhaust reductant before the exhaust reductant is communicated to the SCR system. The filter element 234 can be formed from any suitable material such as, for example, cotton, acrylonitrile butadiene styrene (ABS), any other suitable material or a combination thereof. Moreover, the filter element 234 can have any suitable pore size, for example, about 10 microns, about 5 microns, or about 1 micron.

The hydrocarbon detection device 240 is configured to indicate the presence of a hydrocarbon in the exhaust reductant. For example, the hydrocarbon detection device 240 can be configured to change color when exposed to a hydrocarbon present in the exhaust reductant. In some embodiments, the hydrocarbon detection device 240 can include a strip of hydrophobic paper such as, for example, filter paper, cellulosic paper coated with a hydrophobic coating (e.g., wax, styrene maleic anhydride copolymers, siloxane, GREENCOAT®, any other suitable coating, or a combination thereof), or any other suitable hydrophobic paper. In some embodiments, the hydrocarbon detection device can be formed from nylon, acrylonitrile butadiene styrene (abs), polycarbonate, cellulose, and/or polymethyl methacrylate. The hydrocarbon detection device 240 can be disposed on an inner surface of a sidewall of the filter 230 such that an exhaust reductant flowing through the filter can contact the hydrocarbon detection device 240. The sidewall of the filter 230 can be transparent or translucent such that the hydrocarbon detection device 240 can be visually observed through the sidewall of the filter 230.

In a first instance shown in FIG. 2A an uncontaminated exhaust reductant (e.g., urea diesel exhaust fluid) flows through the filter 230. The uncontaminated exhaust reductant does not wet or otherwise moisten the hydrocarbon detection device 240 such that the hydrocarbon detection device 240 does not change color. In a second instance shown in FIG. 2B, an exhaust reductant contaminated with hydrocarbons (e.g., diesel fuel, injector fluid, and/or oil) flows through the filter 230. In such instances, the hydrocarbons present in the exhaust reductant can wet, cling, stick, or otherwise form a film on the hydrocarbon detection device 240 urging the hydrocarbon detection device 240 to change color. For example, in the first instance, the hydrocarbon detection device 240 can have a light color, and in the second instance, the hydrocarbon detection device 240 can have a dark color. The change in color can be visually observed through the sidewall of the filter 230 and indicate that the exhaust reductant is contaminated with one or more hydrocarbons.

While shown in FIGS. 2A and 2B as disposed on a sidewall of the filter 230, in some embodiments, the hydrocarbon detection device 240 can incorporated into the filter element 234 of the filter 230, as described herein with respect to the hydrocarbon detection device 140 included in the system 100. In such embodiments, the hydrocarbon detection device 240 incorporated into the filter element 234 will change color in the presence of hydrocarbons which can appear as a change in color of the entire filter element 232. Furthermore, the hydrocarbon detection device 240 can be configured to detect the presence of hydrocarbon in the exhaust reductant (e.g., diesel exhaust fluid) at very low concentrations. In some embodiments, the hydrocarbon detection device 240 can be configured to detect the presence of the hydrocarbon in the exhaust reductant at a concentration of less than about 1% by weight, for example, about 0.9%, 0.8%, 0.7%, 0.6%, 0.5%, 0.4%, 0.3%, 0.2%, 0.1%, 0.05%, or about 0.025% by weight, inclusive of all ranges and values therebetween.

Figure 3:
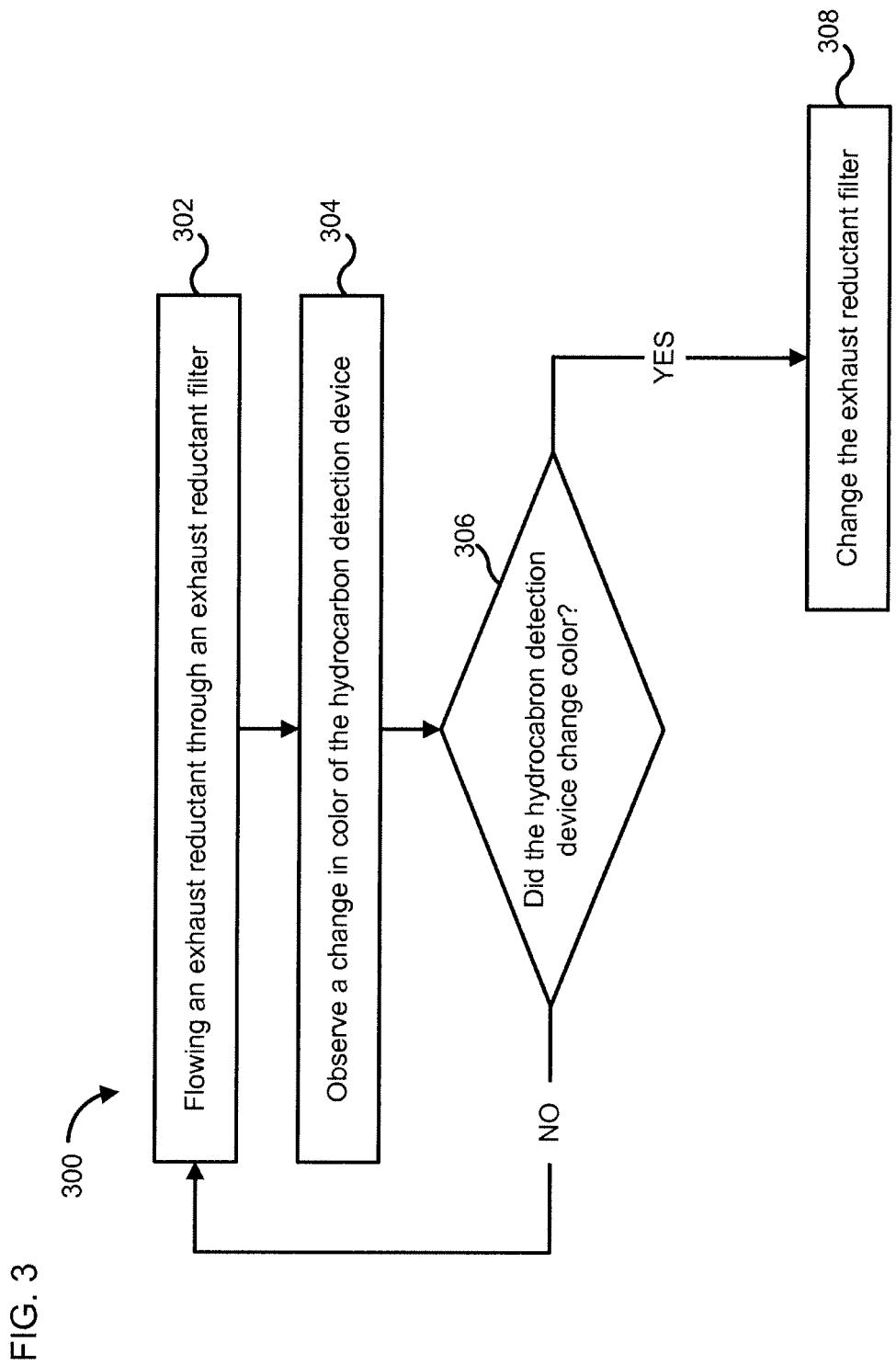
FIG. 3 is a schematic flow diagram of a method for detecting the presence of hydrocarbons in an exhaust reductant using a hydrocarbon detection device, according to an embodiment.

FIG. 3 is a schematic flow diagram of an exemplary method 300 for detecting hydrocarbons present in an exhaust reductant (e.g., a diesel exhaust fluid as described herein) flowing through an aftertreatment system using a hydrocarbon detection device. The method 300 can be used with any aftertreatment system, for example, the aftertreatment system 100 and can be incorporated into any aftertreatment process or method.

The method 300 includes flowing an exhaust reductant through an exhaust reductant filter, at 302. The exhaust reductant can include diesel exhaust fluid (e.g., an aqueous urea solution) or any other suitable exhaust reductant as described herein. The exhaust reductant filter includes a housing defining an internal volume. A filter element is disposed in the internal volume and is configured to filter particulate from an exhaust reductant passing through the filter element. The filter element can include any suitable filter element as described with respect to the filter 130, 230, or any other filter described herein.

A hydrocarbon detection device is disposed in the internal volume of the exhaust reductant filter. The hydrocarbon detection device is configured to indicate the presence of a hydrocarbon in the exhaust reductant. The hydrocarbon detection device can be substantially similar to the hydrocarbon detection device 140, 240, or any other hydrocarbon detection device described herein. In some embodiments, the hydrocarbon detection device can include a hydrophobic paper (e.g., as described with respect to the hydrophobic detection device 140, or 240). In some embodiments, the hydrocarbon detection device can be disposed on an inner surface of a sidewall of the exhaust reductant filter. In such embodiments, the sidewall of the exhaust reductant filter can be transparent or translucent to allow viewing of the hydrocarbon detection device through the sidewall.

The method 300 further includes observing a potential change in color of the hydrocarbon detection device, at 304. The change in color represents that a hydrocarbon is present in the exhaust reductant. It is then determined if the hydrocarbon detection device changed color, at 306. If the hydrocarbon detection device did not change color, no action is taken and the method 300 returns to operation 302. If on the other hand, the hydrocarbon detection device changed color, the exhaust reductant filter is changed at 308.

The method 300 can enable detection of hydrocarbons in diesel exhaust fluid at very low concentrations. For example, the hydrocarbon detection device can be configured to detect the presence of the hydrocarbon in the diesel exhaust fluid at a concentration of less than about 1% by weight, for example, about 0.9%, 0.8%, 0.7%, 0.6%, 0.5%, 0.4%, 0.3%, 0.2%, 0.1%, 0.05%, or about 0.025% by weight, inclusive of all ranges and values therebetween.

Hydrocarbon Detection Device Including a Hydrophobic Paper

Figure 4B:
FIG. 4B shows the hydrocarbon detection device of FIG. 4A experiencing a change in color after brief exposure to a diesel exhaust fluid contaminated with diesel fuel.
Figure 4A:
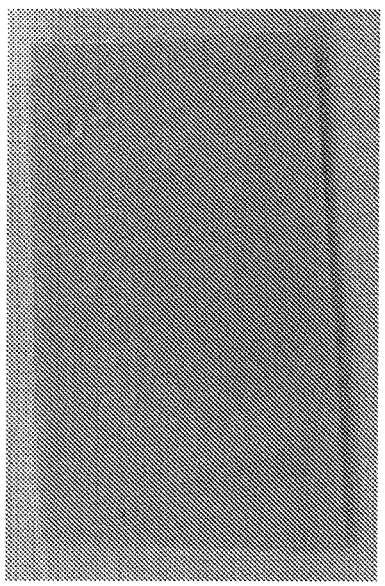
FIG. 4A shows a hydrocarbon detection device that includes a hydrophobic paper that is exposed to an uncontaminated diesel exhaust fluid.

FIG. 4A shows a hydrocarbon detection device that includes a strip of hydrophobic paper. The hydrophobic paper included cellulose paper with a wax coating. The hydrophobic paper was light blue in color in its dry state. Diesel exhaust fluid that includes about 33% by volume urea in water and was free of hydrocarbons was poured on the hydrophobic paper. The diesel exhaust fluid did not wet the hydrophobic paper and no change in color of the hydrophobic paper was observed as shown in FIG. 4A. The same diesel exhaust fluid, but now contaminated with about 0.05% by weight of diesel fuel, was then poured on the hydrophobic paper. The hydrophobic paper changed color and turned dark blue on contact with the contaminated diesel exhaust fluid. This clearly shows that the hydrophobic paper can be used as a detection device for detecting hydrocarbons in diesel exhaust fluid.

As used herein, the terms "about" and "approximately" generally mean plus or minus 10% of the stated value. For example, about 0.5 would include 0.45 and 0.55, about 10 would include 9 to 11, about 1000 would include 900 to 1100.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An aftertreatment system comprising:
   a reductant tank configured to store reductant, the reductant tank comprising a sidewall configured to interface with the reductant; and
   a hydrocarbon detection device configured to interface with the reductant and change color in response to interfacing with a hydrocarbon in the reductant, the hydrocarbon detection device disposed in the sidewall or coupled to the sidewall.

2. The aftertreatment system of claim 1, wherein the hydrocarbon detection device comprises a hydrophobic paper.

3. The aftertreatment system of claim 1, wherein the hydrocarbon detection device comprises at least one of nylon, acrylonitrile butadiene styrene, polycarbonate, cellulose, a cellulose paper coated with a hydrophobic coating, or polymethyl methacrylate.

4. The aftertreatment system of claim 1, wherein the sidewall comprises a viewing portion disposed over the hydrocarbon detection device, the viewing portion being at least one of transparent or translucent.

5. The aftertreatment system of claim 1, wherein the hydrocarbon detection device is configured to absorb the hydrocarbon when interfacing with the hydrocarbon.

6. The aftertreatment system of claim 1, wherein the hydrocarbon detection device is configured to attract the hydrocarbon when interfacing with the hydrocarbon so as to form a film upon the hydrocarbon detection device.

7. The aftertreatment system of claim 1, wherein the hydrocarbon detection device changes color by transitioning from a first color having a first brightness to a second color having a second brightness less than the first brightness.

8. The aftertreatment system of claim 1, further comprising a selective catalytic reduction system configured to treat an exhaust gas flowing through the selective catalytic reduction system.

9. A method for detecting the hydrocarbons using the aftertreatment system of claim 1, the method comprising:
   exposing the hydrocarbon detection device to reductant in the reductant tank; and
   determining that the hydrocarbon detection device has at least partially changed color after the hydrocarbon detection device has been exposed to the reductant in the reductant tank.

10. The method of claim 9, further comprising changing the hydrocarbon detection device in response to determining that the hydrocarbon detection device has at least partially changed color.

11. The method of claim 9, further comprising removing at least some of the reductant from the reductant tank in response to determining that the hydrocarbon detection device has at least partially changed color.

12. An aftertreatment system comprising:
    a reductant filter comprising a sidewall configured to interface with reductant, the sidewall defining an internal volume; and
    a hydrocarbon detection device configured to interface with the reductant and change color in response to interfacing with a hydrocarbon in the reductant, the hydrocarbon detection device being at least one of: disposed in the sidewall, coupled to the sidewall, or disposed in the internal volume.

13. The aftertreatment system of claim 12, wherein the hydrocarbon detection device comprises a hydrophobic paper.

14. The aftertreatment system of claim 12, wherein the hydrocarbon detection device comprises at least one of nylon, acrylonitrile butadiene styrene, polycarbonate, cellulose, a cellulose paper coated with a hydrophobic coating, or polymethyl methacrylate.

15. The aftertreatment system of claim 12, wherein the sidewall comprises a viewing portion disposed over the hydrocarbon detection device, the viewing portion being at least one of transparent or translucent.

16. The aftertreatment system of claim 12, wherein the hydrocarbon detection device is configured to absorb the hydrocarbon when interfacing with the hydrocarbon.

17. The aftertreatment system of claim 12, wherein the hydrocarbon detection device is configured to attract the hydrocarbon when interfacing with the hydrocarbon so as to form a film upon the hydrocarbon detection device.

18. The aftertreatment system of claim 12, wherein the hydrocarbon detection device changes color by transitioning from a first color having a first brightness to a second color having a second brightness less than the first brightness.

19. The aftertreatment system of claim 12, further comprising a filter element disposed within the internal volume, the filter element configured to filter particulate from the reductant.

20. The aftertreatment system of claim 19, wherein the filter element is the hydrocarbon detection device or the hydrocarbon detection device is disposed in the filter element or coupled to the filter element.

* * * * *